United States Patent Office 2,995,268
Patented Aug. 8, 1961

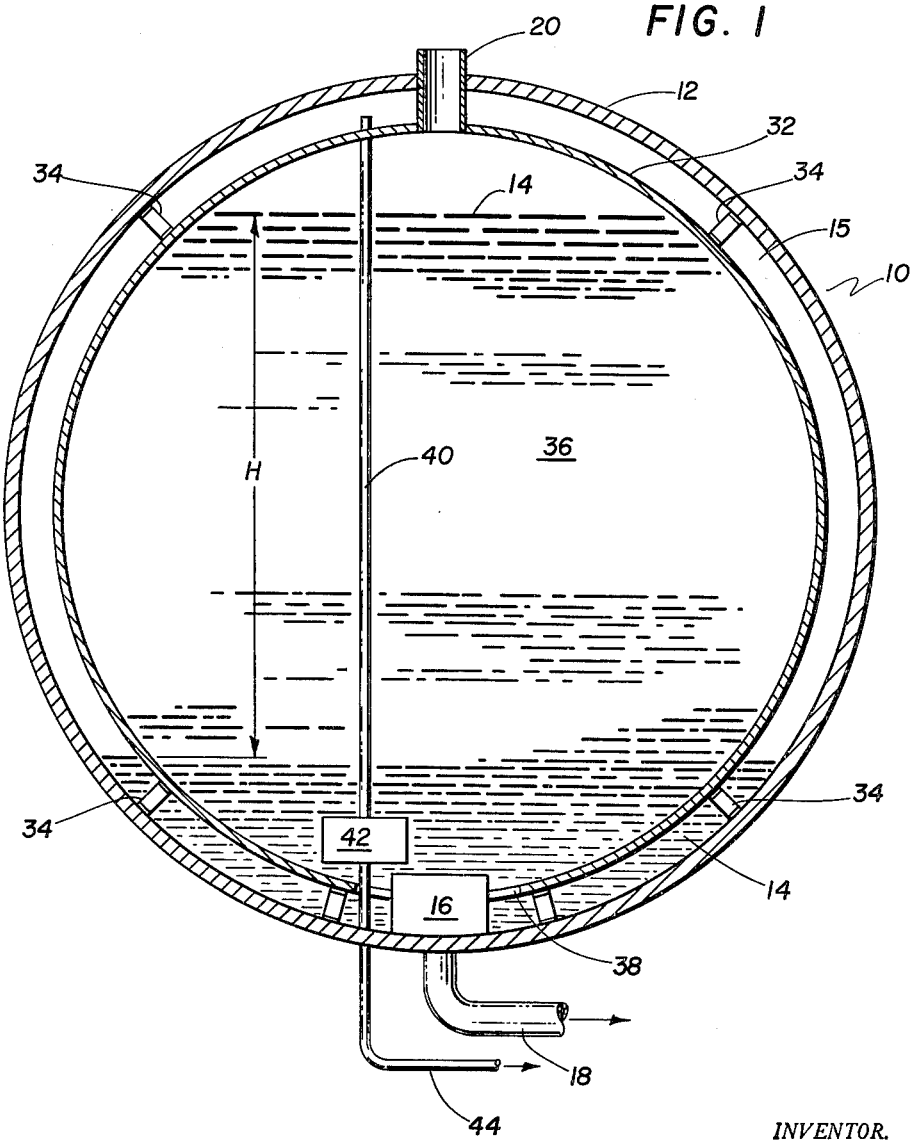

2,995,268
INSULATED TANK CONSTRUCTION
David D. Kurtovich, Seattle, Wash., assignor to Boeing Airplane Company, Seattle, Wash., a corporation of Delaware
Filed Sept. 5, 1958, Ser. No. 759,312
5 Claims. (Cl. 220—15)

My invention relates to a container for liquids, such as an aircraft integral fuel tank, having a new insulation system. The structure is particularly adapted for an aircraft integral fuel tank subject to aerodynamic heating and containing a liquid fuel which must be protected from excessive heating by an insulation. According to my invention, the insulation is formed by vaporization of fuel in a tank interspace formed by inner and outer tank walls and having liquid communication with the major portion of the liquid body only through bottom opening means whereby the vapor is trapped in the interspace.

My insulation system is particularly adapted for certain aircraft uses, although in some other applications its use will be advantageous. Particularly in high performance aircraft, aerodynamic heating is a problem generally and is a particular problem when the walls of integral fuel tanks are heated excessively. Minimization of weight is always an objective in aircraft so the insulation system should achieve the required insulation characteristics but should minimize addition of weight. Other considerations include reducing thermal streses on the outer wall structure, minimum interference with structural considerations in the wall design, maximum utilization of available volume of fuel capacity, avoidance of explosion hazards, and reliability of the insulation system.

The objectives of my invention include, therefore, to devise a new system of insulation of a liquid container, to provide an improved insulation design in integral fuel tanks for high performance aircraft, and to provide in such an insulation system the characteristics listed above as well as other desirable features.

My invention will be best understood, together with additional objectives and advantages thereof, from the following description, read with reference to the drawings, in which:

FIGURE 1 is an elevational view, principally in section, showing a specific embodiment of my invention in an insulation system.

As will be evident from the following description, the insulation system applies to various shaped containers including many integral fuel tank configurations found in aircraft. The embodiment selected for the drawing is a tank of cylindrical configuration such as may be found as a portion of manned or missile aircraft fuselage. Other aircraft structure connected therewith is not shown and it will be obvious how the tank construction applies in various aircraft configurations.

Tank 10 is formed by aircraft skins 12 that may have internal structural supports not shown such as ribs, intercostals, stiffeners and longerons. Skin 12 and the structural supports may have substantially the same structural design as they would have in the absence of an insulation system. The insulation system has a tendency to reduce thermal stresses in skins 12. The end walls 15 may have the same double-walled insulation system shown in cross section as to the side wall skins 12 or end walls 15 may be secured directly to edges of liner 32 and not be insulated if aerodynamic or other heating is not present and insulation is not required.

Fuel 14 within tank 10 may be one of a number of types such as the hydrocarbons, i.e., JP-4, and other combustible materials used to supplement hydrocarbon combustion or as a substitute therefor. The fuel is shown as substantially filling the container, as normally would be the case when just filled, but it may be filled to various levels or may be reduced in volume by use of the fuel. Fuel is pumped from tank 10 by a fuel pump 16 at the bottom thereof and having a line 18 either within or outside of the tank envelope leading to the power plant.

A vent to the top of the tank is shown symbolically by a pipe 20 but a more sophisticated structure may be used to provide connection to the atmosphere or to a source of pressurized gas. The admission of outer air or other relatively pressurized gas into the tank during the descent of the aircraft is a common requirement in order to avoid excessive negative pressure differentials across the main tank wall, i.e., skin 12. The gas is admitted into the portion of the tank of minimum temperature thereby reducing the fire hazards encountered. It should be noted that the venting or gas pressurizing system is not necessary for the operation of my insulation system.

The insulation is provided by a close-topped interspace 30 intermediate skin 12 and the main body of liquid 14. Interspace 30 is formed by an inner wall 32 of imperforate material such as metal which is secured in spaced relation to skin 12 by a series of rigid or semi-rigid securing elements 34. The only access between interspace 30 and the chamber 36 formed by the inner walls 32 is through bottom opening means 38. Chamber 36 forms the major portion of the liquid capacity of tank 10. The thickness of interspace 30 will vary with the insulation requirements.

It is preferable to purge interspace 30 of vapors during refueling so that this space will be occupied by a rich vapor mixture, thus reducing explosion hazards. The purging means may take various forms and is shown in the drawing as comprising a line 40 from the top of the inner space to a pump 42 which connects to a line 44 for the drawing off of vapor during refueling or the injection of an inert purging gas. The openings or apparatus for refueling can take one of a number of conventional forms and are not shown.

In the operation of the insulation system, chamber 36 may be partly or completely filled during refueling the same as if no insulation were required. Interspace 30 can be partly or completely filled by gravity flow from chamber 36 and will have the same level if lines 40 and 44 are opened to the atmosphere. When both chamber 36 and interspace 30 are completely filled, tank 10 has substantially the same maximum capacity it would have if insulation were not required. The vehicle may not have immediate high aerodynamic heating and the fuel level may be down somewhat before heating occurs so that expansion of gas in interspace 30 will not result in an over-filled condition in the tank, space being provided by the use of a portion of the fuel through line 18 to the power plant. If expansion space were needed immediately upon flight, tank 10 should not be completely filled so that expansion space is provided.

When the temperature on the inner surface of skin 12 is above the boiling temperature of fuel 14, vapor will start forming in interspace 30, the amount being dependent on the duration of the high temperatures and their level above the fuel boiling point. In FIGURE 1 is shown the condition in which considerable vapor has been formed, the liquid level in the interspace being substantially different than that in the chamber 36, as indicated by the liquid head H. If heating continued long enough, interspace 30 would completely fill with vapor and vapor would discharge through opening 38 and rise to the top of the fuel in chamber 36.

At the end of the high temperature condition, vapor in interspace 30 cools and returns to the liquid state whereby the liquid level in interspace 30 rises. When the liquid fuel turns to vapor some of the heat is absorbed in the process so the system is both an insulation barrier and a heat absorbing process. The relatively dry gas in the interspace has the same characteristics as other gases of like properties as to convection, conduction and radiation insulation. The thickness of interspace 30 will vary with the amount of insulation desired by the vapor layer, e.g., the bulk fuel in chamber 36 should be kept below that temperature which is considered excessive.

Pressure in the vapor occupied portion of interspace 30 varies according to the differential head H of the liquid column in chamber 36 relative the liquid column in interspace 30, the head H being shown in FIGURE 1, plus the vapor pressure above the liquid in chamber 36.

Advantages of the system described include reliability, i.e., simplicity, automatic operation, and no maintenance required; minimum weight and expense; small reduction of tank capacity; safety; and minimum interference with skin and structural design. No filler or the like is required that might clog the fuel lines and parts. The requirement of the insulation is to prevent excessive heating of the fuel. The heat absorbing function of the present system is responsive to the intensity of heating.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. In an integral, liquid-containing aircraft tank, insulation means to minimize heating of the major portion of the liquid contained therein, comprising: said tank having outer skins of imperforate material forming a liquid-containing space, inner walls inside of said skins and support means securing said inner walls spaced from said skins forming an interspace therebetween and defining an inner chamber inside of said inner walls forming the major portion of the capacity of said tank, said inner walls having large opening means between said chamber and said interspace near the bottom of said tank forming direct communication between the bottom of said interspace and the bottom of said chamber of fixed size providing at all times liquid communication between said chamber and said interspace and said size being sufficient to feed liquid at a rate higher than the rate of liquid vaporization in said interspace, said inner walls being otherwise imperforate thereby separating the contents of said chamber from said interspace except through said opening means, vent means extending from the upper portion of said chamber for the admission of outside air or pressurized gas during aircraft descent, said tank having a liquid therein filling at least part of said chamber and interspace, said interspace being void except for said liquid, whereby upon aerodynamic heating of said skins the liquid in said interspace vaporizes creating a vapor insulation and heat-absorbing barrier between the major portion of said inner walls and outer skins.

2. In an integral, liquid-containing aircraft tank, insulation means to minimize heating of the major portion of the liquid contained therein, comprising: said tank having outer skins of imperforate material forming a liquid-containing space, inner walls inside of said skins and support means securing said inner walls spaced from said skins forming an interspace therebetween and defining an inner chamber inside of said inner walls forming the major portion of the capacity of said tank, said interspace completely enveloping said chamber, said inner walls having large opening means between said chamber and said interspace near the bottom of said tank forming direct communication between the bottom of said interspace and the bottom of said chamber of fixed size providing at all times liquid communication between said chamber and said interspace and said size being sufficient to feed liquid at a rate higher than the rate of liquid vaporization in said interspace, said inner walls being otherwise imperforate thereby separating the contents of said chamber from said interspace except through said opening means, said tank having a liquid therein filling at least part of said chamber and interspace, said interspace being void except for said liquid, whereby upon aerodynamic heating of said skins the liquid in said interspace vaporizes creating a vapor insulation and heat-absorbing barrier between the major portion of said inner walls and outer skins.

3. In an integral, liquid-containing aircraft tank, insulation means to minimize heating of the major portion of the liquid contained therein, comprising: said tank having outer skins which are of circular transverse cross section and are of imperforate material forming a liquid-containing space, inner walls inside of said skins which are of circular transverse cross section, and support means securing said inner walls spaced from said skins forming an annular interspace therebetween and defining an inner chamber inside of said inner walls forming the major portion of the capacity of said tank, said inner walls having large opening means between said chamber and said interspace near the bottom of said tank forming direct communication between the bottom of said interspace and the bottom of said chamber of fixed size providing at all times liquid communication between said chamber and said interspace and said size being sufficient to feed liquid at a rate higher than the rate of liquid vaporization in said interspace, said inner walls being otherwise imperforate thereby separating the contents of said chamber from said interspace except through said opening means, said tank having a liquid therein filling at least part of said chamber and interspace, said interspace being void except for said liquid, whereby heat from said skins vaporizes the liquid in said interspace when the boiling temperature of said liquid is exceeded thereby creating a vapor insulation and heat-absorbing barrier between the major portion of said inner walls and outer skins.

4. In a liquid container, insulation means to minimize transfer of heat from the outside of the container to the major portion of the liquid contained therein, comprising: said container having outer walls of imperforate material forming a liquid-containing space, inner walls inside of said outer walls and support means securing said inner walls spaced from said outer walls forming an interspace therebetween with a closed upper end preventing upward escape of vapor and defining an inner chamber inside of said inner walls forming the major portion of the capacity of said container, said inner walls having large opening means between said chamber, said interspace near the bottom of said container forming direct communication between the bottom of said interspace and the bottom of said chamber of fixed size providing at all times liquid communication between said chamber and said interspace and said size being sufficient to feed liquid at a rate higher than the rate of liquid vaporization in said interspace, said inner walls being otherwise imperforate thereby separating the contents of said chamber from said interspace except through said opening means, said container having a liquid therein filling at least part of said chamber and interspace, said interspace being void except for said liquid whereby upon application of heat to the outside of said container the liquid in said interspace vaporizes creating a vapor insulation and heat-absorbing barrier between the major portion of said inner and outer walls.

5. In a liquid container, insulation means comprising: said container having an imperforate, uprising enclosing wall, an inner wall and means securing said inner wall on the inside of said enclosing wall whereby a chamber is formed on the inside of said inner wall, said inner wall forming an interspace with a closed upper end preventing upward escape of vapor between said inner and enclosing walls which communicates with said chamber only in large opening means near the bottom of said container forming direct communication between the bottom of said interspace and the bottom of said chamber of fixed size providing at all times liquid communication between said chamber and said interspace and said size being sufficient to feed liquid at a rate higher than the rate of liquid vaporization in said interspace, said inner wall being otherwise imperforate to separate liquid in said interspace from liquid in said chamber, said container having a liquid therein filling at least part of said chamber and said interspace, said interspace being void except for said liquid whereby heat from said enclosing wall vaporizes the liquid in said interspace when the boiling temperature of said liquid is exceeded thereby creating a vapor insulation and heat-absorbing barrier in said interspace.

References Cited in the file of this patent

UNITED STATES PATENTS

| | | |
|---|---|---|
| 673,073 | Bobrick | Apr. 30, 1901 |
| 1,979,221 | Dana | Oct. 30, 1934 |
| 2,676,773 | Sanz | Apr. 27, 1954 |
| 2,859,895 | Beckwith | Nov. 11, 1958 |